United States Patent Office 3,024,218
Patented Mar. 6, 1962

3,024,218
N,N'-DIALKYL THIOUREAS AS ANTIOZONE AGENTS FOR RUBBER
Henry P. Stevens, Freedom, Pa., assignor to The Firestone Tire & Rubber Company, Akron, Ohio, a corporation of Ohio
No Drawing. Filed June 15, 1955, Ser. No. 515,789
6 Claims. (Cl. 260—45.9)

This invention relates to inhibition of the deteriorating action of ozone on sulfur-vulcanized rubber compositions. The rubber compositions may be those used in tires, inner tubes, rubber thread and other products produced from rubber latexes, and other rubber articles. The compositions consist essentially of natural rubber, a synthetic rubber homopolymer of butadiene or an alkyl derivative thereof, or copolymer of butadiene or an alkyl derivative thereof with a vinyl comonomer, or a mixture of any of these rubbers.

The deterioration of rubber is due to various factors and is evidenced in different ways. The inhibitors of this invention have been found to absorb or destroy ozone and thus prevent or inhibit its deteriorating action on rubber. These antiozone agents are 1,3- or N,N'-substituted dialkyl or dialkenyl, dicycloalkyl or alkylalkenyl or alkylcycloalkyl, or alkenylcycloalkyl thioureas in which the alkyl, cycloalkyl and alkenyl groups contain up to eight carbon atoms. The thioureas are symmetrically substituted, and the substituents may be the same or different. The substituents may be straight chain or branched chain, and if alkyl they may be alicyclic. They may themselves contain substituents such as one or more hydroxyl groups, halogen atoms, or aryl groups. Thus the invention includes the use of 1,3- or N,N'-dimethylthiourea, diethylthiourea, dipropyl thioureas, dibutyl thioureas, diamyl thioureas, dicyclopentylthiourea, dihexyl thioureas, dicyclohexythiourea, diheptyl thioureas, dioctyl thioureas, methylethylthiourea, methyloctylthiourea, diallylthiourea, dicrotylthiourea, dipentenyl thioureas, allylethylthiourea, allyloctyl thioureas, di(betahydroxyethyl)-thiourea, di-(betachloroethyl)-thiourea, etc. The thioureas with longer alkyl and alkenyl substituents show no advantages over the foregoing.

Compounding ingredients have been added to rubbers for a variety of different purposes. This invention has nothing to do with mastication catalysts or other ingredients added to the rubber to condition it for the addition of the pigments such as carbon black, vulcanizing ingredients, antioxidants, etc. Mastication catalysts and other softeners are added to a rubber, either natural or a synthetic rubber, always before the pigments because the mastication is necessary for the proper dispersion and mixing in of the pigments; and mastication catalysts ordinarily are largely used up in the mastication, little or none being left in a subsequent vulcanizate. Other so-called pigments include zinc oxide, titanium oxide, etc. The antiozonants of this invention are added to the rubber after the pigments have been thoroughly dispersed therein, and are retained for their activity in the subsequent vulcanizate.

The inhibiting effect of the antiozonant thioureas of this invention in rubbers was determined with ½ inch dumbbell strips of approximately 100 gauge thickness. These were exposed to ozone, the apparatus and method of determining the deterioration and cracking produced by the ozone being described in the articles by Ford and Cooper appearing in India Rubber World 124, 696 (September 1951) and 125, 55 (October 1951), entitled "A Study of the Factors Affecting the Weathering of Rubber-like Materials—I and II." In the tests the ozone concentration was maintained at 60 parts per 100,000,000 parts of air, except in a few tests where different concentrations were used, as indicated. Two types of tests were conducted. In one type called the dynamic test, the sample was repeatedly stretched between the limits of 0 and 20 percent elongation at the rate of 108 cycles per minute. In the other type of test, the static, the samples were maintained stretched at 12.5 percent elongation. Usually the samples were exposed for seven hours at room temperature, although in several tests different temperatures were used and the duration of the tests was changed, as indicated. No special lights were used. On completion of the test the size of the cracks in each sample was compared visually with the size of the cracks in a blank which contained no antiozone agent and was tested at the same time as the test sample and under identical conditions.

An arbitrary scale of measuring the results was adopted using the numerals 0, 1, 2, 3, 4, and 5 to represent "no visual cracking" and cracks which were "very fine," "fine," "medium," "medium to coarse," and "coarse," respectively.

The blank to which the various antiozone agents were added for the test in natural rubber were compounded according to the following formula:

| | Parts by weight |
|---|---|
| Pale crepe | 100.0 |
| White pigment or filler | 90.2 |
| Stearic acid | 1.2 |
| Sulfur | 3.0 |
| Accelerator | 0.9 |

The pale crepe was first plasticized or masticated on a rubber mill. A usual instrument for measuring the plasticity of rubber is the Firestone Extrusion Plastometer described in Physics 4, 225 (1933) and 7, 73 (1936). The designation T–10 used in connection with determinations made on this instrument refer to the time in seconds required to extrude a definite volume at a temperature of 175° F. under a pressure of 10 pounds. Crude pale crepe, before milling, has a T–10 of 400 to 800. After milling and prior to compounding it has a T–10 of 10 to 20. In compounding the foregoing formula the white pigment or filler is first added to the rubber, usually with the stearic acid, and the milling is continued until the pigment is thoroughly dispersed. Then the sulfur and accelerator are added. A master batch was prepared in this manner and then the various antiozonants referred to in the following table were added. In production, the pigment would be added first to the plasticized natural rubber, ordinarily with the stearic acid. Then the sulfur, accelerator and antiozonant would be added simultaneously.

The blank for the tests in GR–S (rubbery butadiene-styrene copolymer) was compounded according to the following formula:

| | Parts by weight |
|---|---|
| GR–S | 100 |
| Zinc oxide | 3 |
| Carbon black | 45 |
| Sulfur | 2 |
| Accelerator | 1.3 |

In compounding for the laboratory test or for production, the zinc oxide and carbon black are first mixed with the GR–S. They may be added to the GR–S before coagulation. For test purposes, a master batch was prepared by next adding the sulfur and accelerator. The various antiozonants referred to in the second of the following tables were then separately added to different portions of the masterbatch. In production, the desired antiozonant would normally be added simultaneously with the sulfur and accelerator after the pigment had been thoroughly dispersed in the synthetic.

The pale crepe and GR–S test samples each contained two parts by weight of an N,N'-disubstituted thiourea per 100 parts of the rubber employed, as given in the foregoing formulae, except that in one of the reported tests on natural rubber, wax was added to both the blank and test sample as indicated. The test results on natural rubber are given in the following table:

*Tests in Hevea Natural Rubber*

| Ozone, p.p.h.m. | Temp., °F. | Hrs. |  | Static | Dynamic |
|---|---|---|---|---|---|
| 25 | Room | 7 | Blank | 2 | 3 |
|  |  |  | N,N'-di-isobutylthiourea | 1 | 1 |
| 35 | Room | 7 | Blank | 4 | 4 |
|  |  |  | N,N'-di-isobutylthiourea | 2 | 2 |
| 60 | 95 | 7 | Blank | 4 | 4 |
|  |  |  | N,N'-di-isobutylthiourea | 3 | 3 |
| 45 | 95 | 6 | Blank | 4 | 4 |
|  |  |  | N,N'-diethylthiourea | 2 | 2 |
|  |  |  | N,N'-di-sec-amylthiourea | 2 | 4 |
| 60 | 95 | 7 | Blank | 2 | 2 |
|  |  |  | N,N'-di-n-butylthiourea | 0 | 0 |
|  |  |  | N,N'-diemthylthiourea | 1 | 1 |
| 60 | 95 | 7 | Blank | 2+ | 3+ |
|  |  |  | N,N'-di-isopropylthiourea | 2 | 2 |
| 60 | 95 | 7 | Blank | 2 | 2 |
|  |  |  | N,N'-diethylthiourea | 1+ | 1 |
| 60 | 95 | 7 | Blank | 2+ | 2 |
|  |  |  | N-allyl-N'-methylthiourea | 0 | 0 |
|  |  |  | N-allyl-N'-ethylthiourea | 0 | 0 |
| 60 | 95 | 7 | Blank | 2 | 2 |
|  |  |  | N-allyl-N'-isopropylthiourea | 1 | 1 |
| 60 | 95 | 7 | Blank | 2+ | 2+ |
|  |  |  | N-methyl-N'-ethylthiourea | 1+ | 1 |
| 60 | 95 | 7 | Blank | 2 | 3 |
|  |  |  | N-methyl-N'-t-butylthiourea | 1 | 1+ |
|  |  |  | N-methyl-N'-sec-butylthiourea | 1 | 1+ |
|  |  |  | N-methyl-N'-isopropylthiourea | 1 | 1+ |
| 60 | 95 | 7 | Blank | 4 | 3 |
|  |  |  | N,N'-diallylthiourea | 3 | 2+ |
|  |  |  | N,N'-diethylthiourea | 2+ | 2 |
|  |  |  | N,N'-diemthylthiourea | 2+ | 2 |
| 60 | 95 | 7 | Blank | 3 | 2 |
|  |  |  | N,N'-dicyclohexylthiourea | 2 | 1 |

The effect of the antiozonants is clearly evident.

Five parts per hundred of wax was added to the blank and a test sample containing N,N'-diisobutylthiourea, with these results:

| Ozone p.p.h.m. | Temp., °F. | Hrs. |  | Static | Dynamic |
|---|---|---|---|---|---|
| 60 | 95° F. | 7 | Blank | 4 | 4 |
|  |  |  | Paraffin wax alone | 0 | 5 |
|  |  |  | N,N'-diisobutylthiourea and paraffin wax | 0 | 0 |

Wax itself gives some antiozone protection, but this is improved by adding one of the N,N'-disubstituted thioureas as well as wax. It is seen in the above data that wax alone gives no protection from ozone under dynamic conditions, but the addition of an N,N'-dialkylthiourea results in resistance to ozone under dynamic as well as static conditions.

The results of the tests in GR-S follow:

*Tests in GR-S*

| Ozone, p.p.h.m. | Temp., °F. | Hrs. |  | Static | Dynamic |
|---|---|---|---|---|---|
| 60 | 95 | 7 | Blank | 2 | 2 |
|  |  |  | N,N'-di-n-butylthiourea | 0 | 1 |
| 60 | 95 | 7 | Blank | 4 | 3 |
|  |  |  | N,N'-di-n-butylthiourea | 2 | 2 |
| 60 | 95 | 7 | Blank | 4+ | 3+ |
|  |  |  | N,N'-dimethylthiourea | 3 | 2+ |
| 60 | 95 | 7 | Blank | 3 | 3 |
|  |  |  | N,N'-diethylthiourea | 1 | 1 |
| 60 | 95 | 7 | Blank | 3 | 3 |
|  |  |  | N,N'-dimethylthiourea | 1+ | 1+ |
|  |  |  | N,N'-di-sec-amylthiourea | 0 | 0 |
| 60 | 95 | 7 | Blank | 2+ | 2+ |
|  |  |  | N-methyl-N'-ethylthiourea | 1 | 1 |
| 60 | 95 | 7 | Blank | 4 | 4 |
|  |  |  | N-methyl-N'-t-butylthiourea | 3 | 2+ |
|  |  |  | N-methyl-N'-sec-butylthiourea | 3 | 2+ |
|  |  |  | N-methyl-N'-isopropylthiourea | 3 | 2 |

The foregoing results are illustrative. In actual practice, most stocks will contain some wax. From 0.1 to 10 parts of antiozonant may be used per 100 parts of the rubber.

In the case of latex, antiozonant is generally added to compounded latex which already contains dispersions of vulcanizing ingredients, pigments such as zinc oxide, etc., although the time at which it is added is not critical. An illustrative formula in which any of the foregoing symmetrical disubstituted thioureas may be used, follows:

| | Dry weight, parts | Wet weight, parts |
|---|---|---|
| Heavea latex | 100.0 | 160.0 |
| Sulfur | 2.0 | 4.0 |
| Potassium oleate | 2.0 | 10.0 |
| Accelerator | 2.5 | 5.5 |
| Sensitizer | 0.5–1.0 | 1.0–2.0 |
| Zinc oxide | 5.0 | 12.5 |
| Sodium silicofluoride | 0.5–1.0 | 1.0–3.0 |
| Antioxidant | 1.0 | 2.5 |
| N,N'-disubstituted thiourea | 1.0 | 2.5 |
| Sufficient water to produce 57% total solids | | variable |

Cured films are prepared from the latex or it is beaten to a froth and cured as sponge.

By sulfur-vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Known vulcanization accelerators are useful in speeding up the vulcanization process and operative herein, especially the relatively active accelerators including the thiazole sulfenamides, e.g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N'-disubstituted dithiocarbamates, the thiuram sulfides, the xanthogen sulfides, and metallic salts of mercaptothiazoles or mercaptothiazolines or dithiocarbamic acids.

One or more accelerator activators is often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

This application is a continuation-in-part of my application S.N. 370,208 filed July 24, 1953, now abandoned.

What I claim is:

1. A sulfur-vulcanized rubber composition which includes as an inhibitor of deterioration a small amount of a symmetrical disubstituted thiourea in which the substituents are from the class consisting of alkyl, cycloalkyl and alkenyl groups which contain up to eight carbon atoms, said rubber being from the class consisting of natural rubber, homopolymers of butadiene and alkyl derivatives thereof, copolymers of (a) butadiene and alkyl derivatives thereof with (b) vinyl comonomers, and mixtures of the foregoing.

2. Sulfur-cured film of a rubber deposited from a latex of said rubber which film contains a small amount of a symmetrical disubstituted thiourea as an antiozonant in which disubstituted thiourea the substituents are from the class consisting of alkyl, cycloalkyl and alkenyl groups which contain up to 8 carbon atoms; said rubber being from the class consisting of natural rubber, homopolymers of butadiene and alkyl derivatives thereof, copolymers of (a) butadiene and alkyl derivatives thereof with (b) vinyl comonomers and mixtures of the foregoing.

3. Cured sponge of a rubber latex which sponge is produced from said latex and contains a small amount of a symmetrical disubstituted thiourea as an antiozonant in which disubstituted thiourea the substituents are from the class consisting of alkyl, cycloalkyl and alkenyl groups which contain up to 8 carbon atoms, said rubber being from the class consisting of natural rubber, homopolymers of butadiene and alkyl derivatives thereof, copolymers of (a) butadiene and alkyl derivatives thereof with (b) vinyl comonomers and mixtures of the foregoing.

4. The process of vulcanizing sulfur-vulcanizable rubbery butadiene-styrene copolymer which comprises vulcanizing the same with sulfur in the presence of a small amount of a symmetrical di-i-butyl thiourea.

5. Sulfur-vulcanized styrene-butadiene rubber which contains a small amount of symmetrical disubstituted thiourea in which the substituents are from the class consisting of alkyl, cycloalkyl and alkenyl groups which contain up to eight carbon atoms as an antiozonant.

6. A sulfur vulcanized rubber composition comprising a member selected from the group consisting of natural rubber and butadiene-styrene copolymer rubber and an antiozonant amount of a compound having the structure:

$$\begin{array}{c} \text{H} \quad \text{S} \quad \text{H} \\ | \quad \| \quad | \\ \text{R}-\text{N}-\text{C}-\text{N}-\text{R}_1 \end{array}$$

in which R and $R_1$ are identical and are selected from the group consisting of alkyl radicals having not in excess of six carbon atoms and cyclohexyl radicals.

References Cited in the file of this patent

UNITED STATES PATENTS

| | | |
|---|---|---|
| 2,154,341 | Martin | Apr. 11, 1939 |
| 2,444,881 | Sterrett | July 6, 1948 |
| 2,576,458 | Hill et al. | Nov. 27, 1951 |
| 2,583,370 | Goppel et al. | Jan. 22, 1952 |
| 2,651,620 | Hill et al. | Sept. 8, 1953 |
| 2,766,219 | Beaver et al. | Oct. 9, 1956 |